United States Patent [19]

MacLean, Jr. et al.

[11] Patent Number: 5,226,156
[45] Date of Patent: Jul. 6, 1993

[54] CONTROL AND SEQUENCING OF DATA THROUGH MULTIPLE PARALLEL PROCESSING DEVICES

[75] Inventors: Neil H. MacLean, Jr.; Robert W. Miller; Mayank R. Patel, all of Tucson, Ariz.

[73] Assignee: International Business Machines Corporation, Armonk, N.Y.

[21] Appl. No.: 615,662

[22] Filed: Nov. 19, 1990

Related U.S. Application Data

[63] Continuation of Ser. No. 441,127, Nov. 22, 1989, abandoned.

[51] Int. Cl.⁵ ............................................. G06F 13/00
[52] U.S. Cl. ............................. 395/600; 364/DIG. 1; 364/239; 364/239.3; 364/260.6
[58] Field of Search .............. 364/DIG. 1 MS File, 364/DIG. 2 MS File; 395/200, 250, 275, 600, 650, 700, 800; 341/50, 55, 60, 95, 81

[56] References Cited

U.S. PATENT DOCUMENTS

4,232,375 11/1980 Paugstat et al. ..................... 395/200
4,899,147 2/1990 Schiavo et al. ..................... 341/60

FOREIGN PATENT DOCUMENTS

0029394 11/1979 European Pat. Off. .
0059829 3/1981 European Pat. Off. .

Primary Examiner—Robert B. Harrell
Attorney, Agent, or Firm—C. B. Lobsenz; J. A. Pershon

[57] ABSTRACT

A plurality of parallel processing devices such as compression/decompression units can be tied together to sequentially process equal amounts or sets of data from a stream of data. Hardware in the upper level of each device acts as a demultiplexer to control the acceptance of only its set of data to transfer control to permit the next device to accept data and also stores its set for compaction. Essentially identical hardware in the lower half of each device acts as a multiplexer to control the acceptance of its compacted set of data to store the compacted set and to place the compacted set into the original sequence of the stream of data for storage on the tape media. The lower half reverses its role when the compacted set of data is retrieved from the media to act as a demultiplexer for the decode sequence while the upper half acts as a multiplexer to resequence the decompacted sets into its original stream.

58 Claims, 6 Drawing Sheets

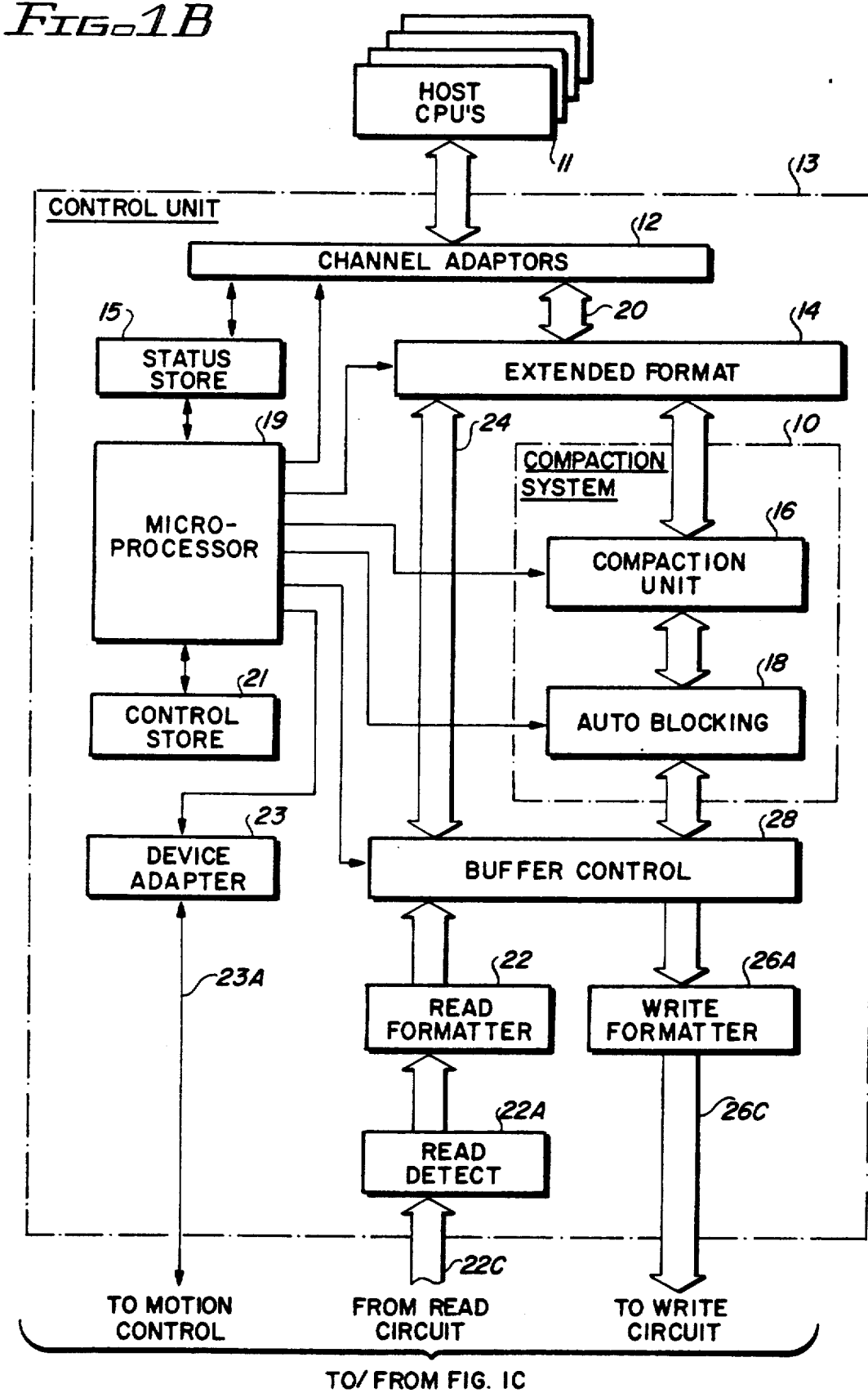

CONTROL AND SEQUENCING OF DATA THROUGH MULTIPLE PARALLEL PROCESSING DEVICES

CROSS REFERENCE TO RELATED INVENTIONS

This is a continuation of Ser. No. 441,127 filed Nov. 22, 1989, now abandoned.

Related copending Patent Applications are Ser. No. 372,744, filed on Jun. 28, 1989, entitled "Combining Small Records Into A Single Block For Recording On A Record Media", Dunn, E. C., et al.; Ser. No. 07/441,126, filed on Nov. 22, 1989, now abandoned, entitled "Data Compression For Recording On A Record Medium", MacLean, N. H. et al.; and Ser. No. 07/441,126, filed on Nov. 22, 1989, now abandoned, entitled "Format Compatibility In Compression/Decompression Devices", MacLean, N. H., et al.

FIELD OF THE INVENTION

The present invention relates generally to digital processing devices, and in particular, to peripheral subsystems in the supervisory control of the subsystems.

BACKGROUND OF THE INVENTION

Information processing systems, which handle ever increasing amounts of data, require parallel processing devices that have the ability to handle the increasing amounts of data. The control and sequencing of the processing generally requires extensive hardware to insure that the maximum efficiency is obtained in the distribution of the data to each processing device.

It is, therefore, an object of the present invention to provide a simplified hardware for the control of the splitting and merging of a data stream through multiple parallel processing units.

Formerly, separate multiplexer and demultiplexer controlled hardware was required at each unit interface to control the distribution of each section of data into a separate processing unit. Thus a demultiplexer was required in order to distribute the data to the separate processing units and a multiplexer was needed at the exit of the processing unit in order to reassemble the data. Separate multiplexers and demultiplexers were required if the processing device was a reversible type unit such as a compactor/decompactor unit where the data was compacted through the processing unit and decompacted when the data was returned from the memory store for instance for placing the data into its original format as sent by a host central processing unit.

It is, therefore, another object of the present invention to provide hardware at the interfaces to a processing unit that can act as a distribution sequencing unit and an assembling resequencing unit, a demultiplexer and a multiplexer, to thereby lessen the hardware requirement while providing control of the splitting and merging of the data stream through the processing device.

SUMMARY OF THE INVENTION

In accordance with the present invention, event counters are used in each processing device for the input and output interfaces to control and verify the splitting and the merging of the respective data streams. An incoming serial data stream is divided into a plurality of sets of data of a size to fit into a buffer unit of each processing device. Each processing device receives the set and then processes the set while the next processing device in line receives the next set of data. The processed sets of data are stored into another buffer in each processing unit and the output of this buffer is sent to the output interface in the same order that the data stream was received thus maintaining the original sequence.

In the total attribute of the present invention, a control unit, through channel adaptors, accepts the requests from host central processing units to control a device such as a magnetic tape recording device. The device could also be a magnetic disk or optical recording device. Also, the device could be a plurality of recorders within the aspects of this invention.

The control of the device for media motion control is through a microprocessor and a device adaptor, and a motion control unit generally in the device. The motion control unit controls the carriage control for handling of the insertion and extraction of the media, the threading mechanism, if the media is a tape held within a cartridge, and for placing the media in contact with a transducer for reading and writing onto the media. The motion control also controls the speed and tension of the tape media for correct interaction with the transducer.

The data transfer to and from the media via the transducer is through read and write circuits and formatters to a buffer control which operates under the control of the microprocessor to adapt the data useable by the host CPU into the type of data for storage onto a utilization device, the media device. The compaction and decompaction of the data by the control unit for storage and retrieval to and from the devices is through a compaction system. The data from the channel adaptor is compacted in a compaction unit and an autoblocking unit of the compaction system and then written onto the media by the transducer for storage. The compaction unit includes a plurality of processing devices. Event counters are used in each processing device for the input and output interfaces to control and verify the splitting and the merging of the respective data streams. The incoming serial data stream is divided into the plurality of sets of data. Each processing device receives the set and then processes the set while the next processing device in line receives the next set of data. The processed sets of data are stored in each processing unit and sent to the output interface and to the device for writing on the media in the same order that the data stream was received, thus maintaining the original sequence.

To retrieve the compacted sets of data, the transducer reads the data from the media as the media is transported past the transducer under control of the motion control and the control unit. The data read by the transducer is amplified and converted, and directed through a buffer control to be decompressed by the processing devices of the compaction system to return the compressed data to the original state for transmission to the channel adaptors and the host CPU. The compacted sets of data are directed to each processing device where they are separated into individual sets and decoded, i.e. decompacted, and reassembled.

Thus, the present invention provides a compaction system for compacting and decompacting data, a means for directing data received from a host CPU to the compacting system, a device for handling a storage media, a means for controlling the motion of the storage media in the device, a means for transforming the compacted data into a format for placement onto the storage media, a transducer for storing and retrieving the formatted compacted data to and from the media, means for transforming the retrieved, formatted compacted data into compacted data, means for directing the retrieved compacted data to the compaction system for decompaction, means for directing the decompacted data to the host CPU, and means, under control of the host CPU, to direct the transfer of data through the controls and the device and the placement and retrieval of the data to and from the storage media.

It is, therefore, another object of the present invention to provide an enhanced hardware that permits the high speed transfer of data from the information processing system, along its channels, to the compressed data scheme onto the record media.

Initially, the first processing device has control of the interface and activates the signal identifying that it is receiving data from the data stream. The signal is active until the first processing device receives all of its data from the data stream. The first processing unit then deactivates its output signal and the next processing device in turn will take control of the interface and activates its signal until it has received all of the second set of data from the data stream. At that time the second processing device deactivates its output and the next processing device, in turn, continues to receive its set of data. The sequence continues form the last processing device to the first processing devices until all the sets of data from the data stream have been received and processed.

In the compaction unit, each processing device has two interface event counters to count the number of sets of data transferred on each interface, input and output. Each processing device can thereby calculate when it should take control of the interface and verify that the previous processing device has relinquished control. Further, the processing device downstream of the processing device taking control to receive data can verify that the upstream processing device indeed has taken control. The transfer of the control of the interface occurs at set data boundaries. Each time an end of set is detected or, if the sets are of the fixed size, that is, when that amount of data has been received, the control of the interface is transferred from the present processing device to the next processing device downstream.

Another object of the present invention, therefore, is to provide an enhanced system for the effective storage and retrieval of data onto a record medium.

For the preferred embodiment of the present invention, the block of data is divided into a plurality of sets of data of similar size for processing. Each set is directed to each of the processing devices for handling, such as for the preferred embodiment to compress the data. A storage control in the processing device accepts the data from the data stream and, when full, signals the compression encoder to begin processing the set. The storage control acts as a register to store the sets, as a demultiplexer to distribute the set of data to a compression encoder, for instance, and as a multiplexer to receive and reassemble the sets after decompression from the decoder.

After encoding, the compacted sets of data are reassembled in a second storage control that likewise acts as a register to store the compacted sets, as a multiplexer to reassemble the sets after compaction encoding, and as a demultiplexer to receive and separate the compacted sets of data for decompression in a decoder.

Each processing unit guarantees that a determinable maximum amount of time is spent on each set of data thereby ensuring that a minimum data rate is accomplished for each unit. Therefore, the data flow for the total system can be increased by adding processing units since each processing device adds a process, i.e., encoding and decoding of that set of data from the data stream.

Another object of the present invention, therefore, is to provide and enhance control and sequencing of multiple parallel processing devices.

Yet another object is to provide for the control and sequencing of compaction and decompaction processing devices such that a minimum data rate is accomplished for each processing device.

Still another object is to provide for the sequencing of multiple parallel processing devices that eliminate the need for separate multiplexer and demultiplexer control hardware for each interface to the processing devices while verifying the control of the multiplexing and demultiplexing of the data streams at the input and output interfaces.

The foregoing and other objects, features and advantages of the invention will be apparent from the following more particular description of the preferred embodiment of the invention, as illustrated in the accompanying drawings.

BRIEF DESCRIPTION OF THE DRAWING

The various novel features of this invention, along with the foregoing and other objects, as well as the invention itself both as to its organization and method of operation may be more fully understood from the following description of illustrated embodiments when read in conjunction with the accompanying drawing, wherein:

FIG. 1B and 1C are a more specific flow block diagram of FIG. 1A;

DETAILED DESCRIPTION

In general, the present invention can be used with any processing device operating in parallel on the same data stream. The present invention is preferable for use with a magnetic tape system and in particular is for use in the IBM 3490 tape subsystem. The processing devices comprise four data compaction encoders/decoders all running in parallel in order to maximize throughput and transmission bandwidth. Data is compacted (encoded) prior to being written on the tape media and decompacted (decoded) subsequent to being read from the tape media. The best mode described herein will, therefore, be for a magnetic tape system with data compaction capabilities, but it should be understood that the invention could be adapted for use in any storage system, especially a magnetic tape and disk system and optical storage system. The invention could also be adapted in any parallel data processing or digital communication system which receives and packatizes the data. The data is then processed and remerged in its original form after processing for transmission to a utilization device.

The requirements for ever increasing throughput and transmission rates on high performance peripheral storage subsystems dictate a parallel architecture for the data compaction hardware. The present invention provides the capability to control and verify the sequencing of the input and the output data streams such that the input data stream can be split, compacted or decompacted, then reemerge at a data rate equal to the number of compaction hardware units times the data rate provided by each unit.

Figure 1A:
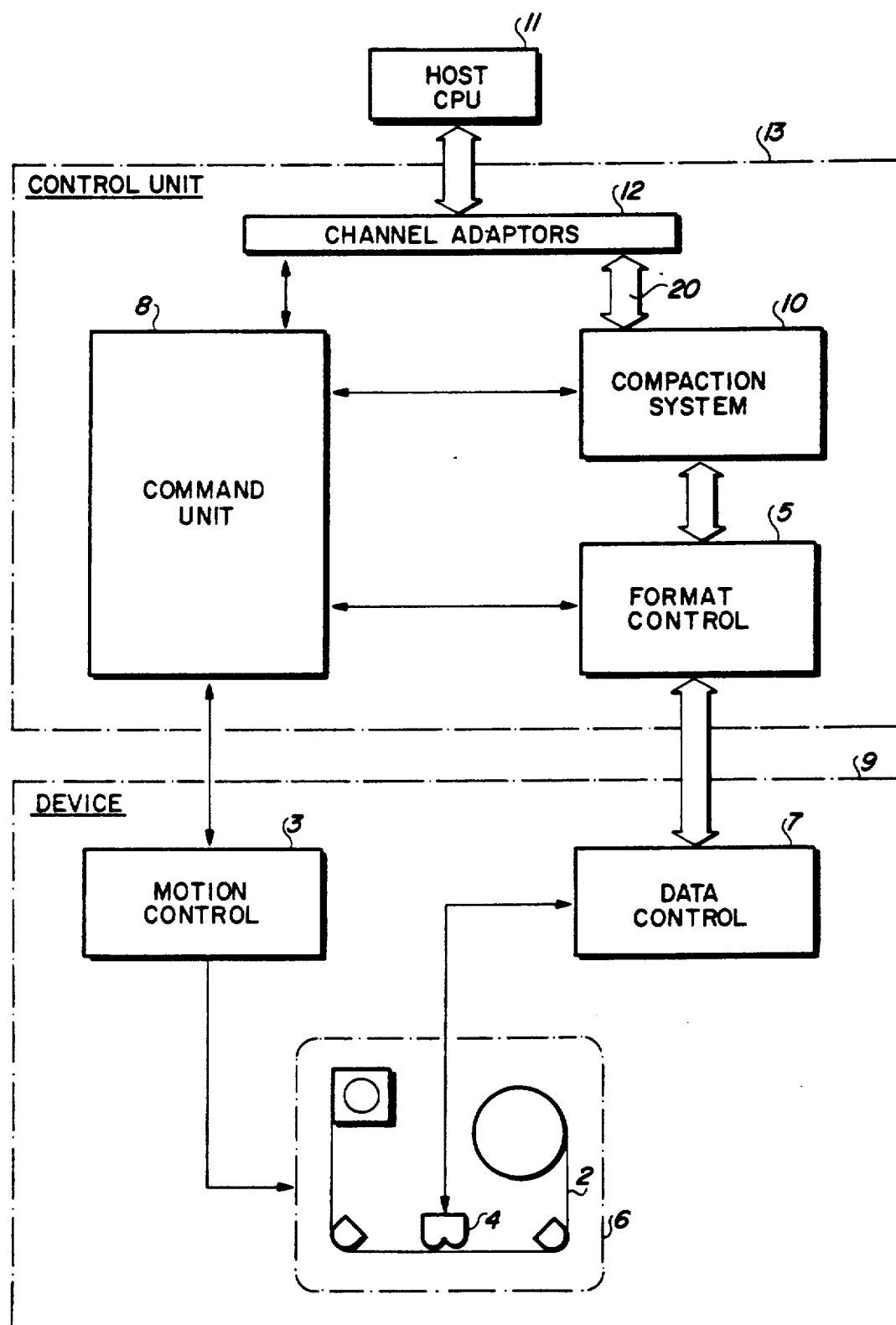
FIG. 1A is a high level flow block diagram of a data processing system of the present invention.
Figure 1C:
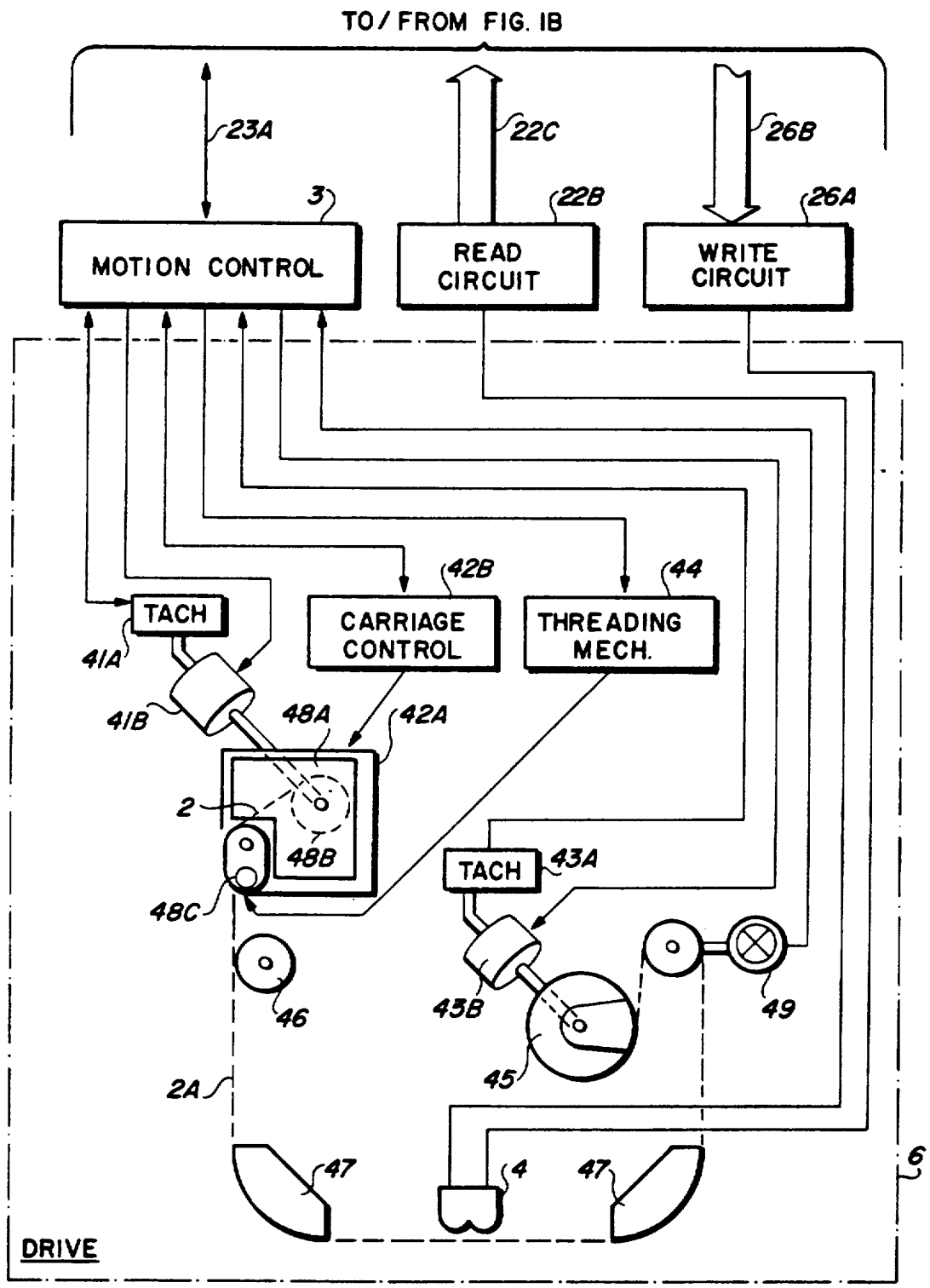
Figure 1D:
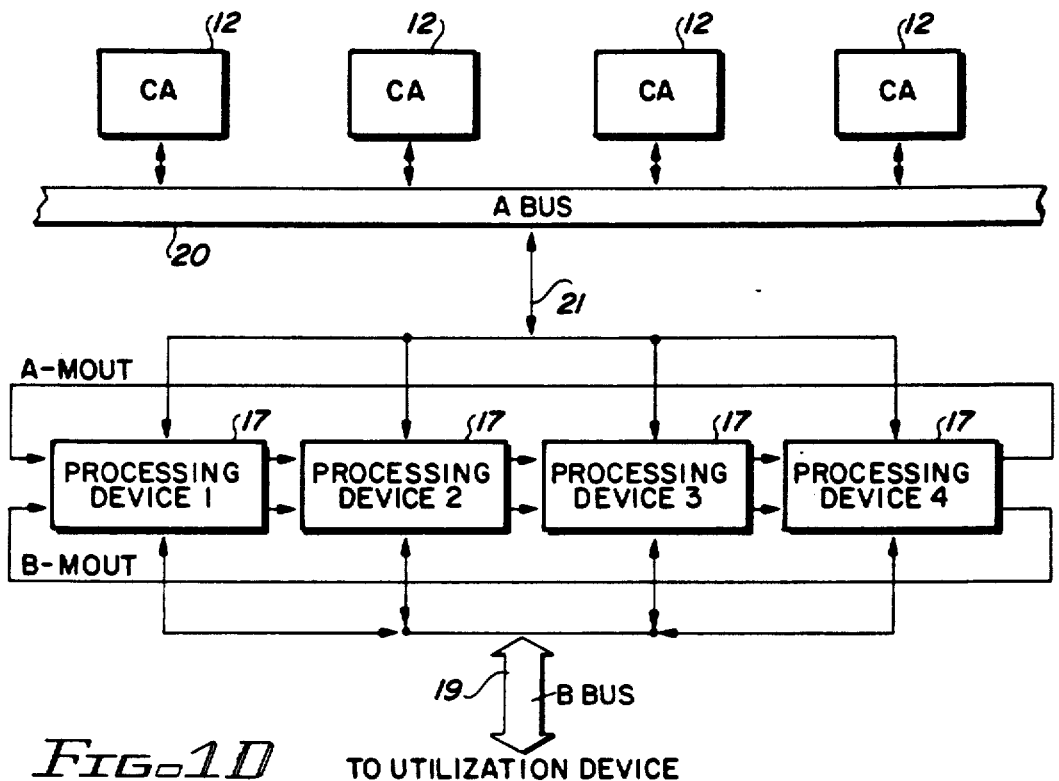
FIG. 1D is a system block diagram showing the interconnection of the plurality of processing devices, four shown, according to the present invention.

The embodiment of the present invention utilizes four hardware processing devices as shown in FIG. 1D. It should be evident that more or less processing devices could be used in parallel to accomplish the advantages of the present invention.

Referring more particularly to the drawing, the same reference numerals indicate like structural features in operation in the various features of the drawing.

In general, referring to FIG. 1A, a data processing subsystem is controlled by a plurality of host central processing units (CPU) 11 to store and retrieve data that is required by the host units. The data processing subsystem includes at least one control unit 13 and at least one device 9. The control unit 13 accepts the commands and data from the hosts 11 via channel adaptor 12 and controls itself and the devices accordingly. The device 9 could be magnetic tape recording device as shown in the preferred embodiment, or magnetic disk or optical recorders.

The magnetic tape recording device 9 includes a means for controlling the handling of the tape media, a motion control 3, and the device mechanism in a drive 6 for transporting a tape 2 past a transducer 4 for writing and reading data to and from the tape media.

Generally a data control 7 provides read and write circuits int he device 9 to operate the transducer 4. The data control 7 is connected by a cable to a format control 5 in the control unit 13. The format control 5 is shown connected by a data cable to a compaction system 10 which in turn is connected to the channel adaptor 12. The motion control 3 is controlled by a command unit 8 in the control unit 13. The command unit 8 takes the commands transmitted to the channel adaptors 12 by the hosts 11 and controls the operations of the drive 6 via the motion control 3, and the flow of data to and from the channel adaptors 12 through the format control 5 and the data control 7. A compaction system 10 is shown inserted into the data flow to compact and decompact the data for storage on the tape media 2 and retrieval from the tape media 2, respectively. FIGS. 1B and 1C show a more detailed block diagram of the data processing system of FIG. 1A. FIG. 1B shows a block diagram of the control unit 13 and FIG. 1C shows a block diagram of the device 9. The bottom of FIG. 1B is connected by cable and command lines to the top of FIG. 1C.

Referring to FIGS. 1B and 1C, the command unit 8 of FIG. 1A includes a status store 15, a microprocessor 19, a control store 21 and a device adaptor 23. An extended format 14 is essentially a part of the command unit 8 in the control of the data flow. The extended format 14 provides the capability of providing no compaction or decompaction of the data by bypassing the compaction system 10 as shown by a data cable 24. A buffer control 28 operates under control of the microprocessor 19 to store the data written on tape 2 by the write formatter 26 and the write circuit 26A of FIG. 1C to the transducer 4. The buffer control 28 also controls the data flow on a read cycle to store the data processed by a read circuit 22B from the transducer 4 and transmitted to a read detect 22A over connecting cable 22C and to a read formatter 22 to the buffer control 28. The compaction system 10 includes a compaction unit 16 and an auto blocking unit 18. The compaction unit 16 will be further discussed in FIG. 1D.

The tape recording device 9 of FIG. 1C shows the drive 6 under control of the motion control 3 to accomplish the controlled transporting of the tape 2 past the transducer 4 to accomplish the read and writing of the magnetic transition onto the tape 2 and useful in the present invention. The tape recording device 9 includes a supply reel motor 41B and a tachometer control 41A, a carriage 42A and a carriage control 42B, a take up reel 45 and its motor drive 43B and tachometer control 43A, a threading mechanism 44, various controls of a tape path 2A such as idler 46, compliant tape guides 47 and a tape tension control 49. The tape media 2 of this preferred embodiment is contained in a cartridge 48A shown placed into the carriage 42A. The cartridge 48A, besides the tape 2, includes a supply reel 48B and a leader block 48C, shown connected for threading by the threading mechanism 44. Reference is made to U.S. Pat. No. 4,389,600, for a more complete description of a tape drive and control shown in FIG. 1C.

Referring now more particularly to the drawing, like numbers indicate like parts and structural features in the various figures. In FIGS. 1A-C, a data processing system is shown including a magnetic tape recorder storage subsystem connected via its control unit 13 to a host system 11 including a plurality of central processing units. The magnetic tape recorder storage subsystem includes the control unit and the magnetic tape device 9. The control unit 13 provides data transfers between a plurality of devices, one indicated as being a reel-to-reel type of magnetic tape recorder 9, and the host system 11 via a plurality of channel adaptors 12. The host system 11 requests for data transfers either to or from the devices 9. All operations of the control unit 13 and the devices 9 depend upon commands and other control data received from the host system 11 through the channel adaptor 12. The total subsystem status is maintained in the control unit 13 via the status store 15. The status store 15 includes a plurality of registers containing bytes relating to device status, buffer status, channel status, and the like. Such status information reflects the selection status of the device 9, its busy status, contingent connection and all other status necessary for operating the storage subsystem with the channel adaptors 12.

A programmed microprocessor 19 operates in accordance with a microcode program store din a controls tore 21. Such microprograms enable the microprocessor 19 to completely manage the buffer control 28 to provide and supervise the data flow between the channel adaptors and the device 9. The microprocessor 19 supervises and enables the selection of the channel adaptors 12. A device adaptor 23, controlled and supervised by the microprocessor 19, controls the operation of the motion control system 3. A separate device adaptor 23 controls each of the plurality of tape recorder devices 9. The microprocessor 19, using known techniques, selected the microprograms of the control store 21 as commanded by the host CPU 11. Control data is supplied from the control store 21, including microprogramming instruction words. The microprocessor 19 is interrupt driven through a plurality of interrupt levels. These interrupts are supplied by the various elements of the control unit 13, the priority of which is preassigned in accordance with the functions to be performed in the control unit 13 and the tape recorder device 9.

A representation of the tape recorder device 9 is shown in FIG. 1B. Reference is made to a U.S. Pat. No. 4,125,881 to Eige, et al., for a more complete description of a control circuit useable for a reel-to-reel tape drive. Only the apparatus and procedure for an understanding of the present invention is given herein. As shown in FIG. 1B, the tape recorder device 9 includes the supply reel tachometer 41A which is connected to the supply reel motor 41B. The supply reel motor 41B is driven by the motion control 3 to reversibly rotate the supply reel 48B shown located within the single reel cartridge 48A. The tachometer 41B indicates to the motion control the number of rotations and the rotational position of the motor 41B and the supply reel 42, 3. The take up reel tachometer 43A is connected to the take up reel motor 43B that is reversibly driven by the motion control 25. The motor 44 drives the take up reel 45. The tape, in the preferred embodiment the magnetic tape 2, takes a path, shown by a dotted line 2A from the supply reel 48B to the take up reel 45 past the idler bearing 46, the air bearing guides 47 and the magnetic head 4. The tape path continues around the guide of the tension arm transducer 49 to the take up reel 45.

Thus, for the discussion of FIG. 1B, the motion control unit 3, after the entry of a supply reel 48A onto the clutch drive (not shown), activates the motor 41B. The entry of the cartridge 48A into the carriage 42A activates the carriage control 42B which in turn causes the motion control unit 3 to activate the motor 41B. The motion control 3 directs a threading operation by activating the threading mechanism 44 which will pull the tape through its path 2A past idler bearing 46, air bearing guides 47, magnetic head 4, and the tension arm transducer 49 onto the take up reel 45. In the reading and/or writing of information onto the tape via the magnetic head 48, the speed of the motors 41B and 43B are controlled by the motion controls 3 through the tachometers 41A and 43A, respectively. The writing of information onto the tape 2 is accomplished through the write formatter 26 which places the data to be written into its format for placement onto the tape. The output of the write formatter 26 from the control unit 13 is directed to the write circuit 26A int he tape recorder device 9. The write circuit 26A controls the magnetic transducer 4 to accomplish the writing of the data onto the tape 2.

To retrieve or read the information that was written onto the tape 2, the read circuitry is activated. The magnetic transducer 4 will sense the magnetic transitions written onto the tape 2 and will direct its analog output to the read circuit 22B. The read circuit 22B amplifies the analog signals received from the magnetic transducer 48 and directs its output to the read detect 22A in the control unit 13. The read detect 22A circuitry converts the analog signal to the digital signal required for the control unit 13. The output of the read detect 22A is directed to the read formatter 22 to direct the digital read information for storage in the buffer controller 28.

The actual control of the operation of read tape recorder device 9 as shown in FIG. 1B is accomplished through the microprocessor 19 of the control unit 13. The device adaptor 23 includes tag control lines and bus data transfer lines which enables the control unit 13 to closely control and operate the tape recorder device 9 through the motion control 3.

The microprocessor 19 controls the buffer control 28 to accomplish the reading and writing of the data to and from the tape and also through the device adaptor 23 and the motion control 3 controls the transport of the tape 2 over the magnetic transducer 4 to accomplish the actual reading and writing of the data itself.

The embodiment of the present invention utilizes four hardware processing devices as shown in FIG. 1D. It should be evident that more or less processing devices could be used in parallel to accomplish the advantages of the present invention.

Referring now especially to FIG. 1D, a plurality of processing devices (PD) 17, is inserted into the standard read and write flow that interconnects a plurality of channel adapters (CA) 12, to interface with a utilization device, the data control 7 of device 9 which enables transducer 4 to write and read to and from the recording media 2. The data stream from the host central processing unit is directed to one of the plurality of channel adapters 12, to interface with the four parallel processing devices 17 of the compaction unit 16. A CA command set, extended format, directs the data stream transfer through the CA 12, interfaces to an A-bus 20, and along a line 21, to the plurality of parallel processing devices 17. The data stream from the A-bus 20, is directed to all of the processing devices 17, and it is an A-mout signal that controls the receipt and distribution of the data to and from the processing devices. That will be discussed in more detail later. The processing devices 17 receive the unformatted data from one CA 12, and separate the unformatted data into identical size blocks or sets of data from the data stream. The individual sets of data are then directed to individual processing devices, PD 1-4, for processing of each set in turn by the plurality of processing devices 17. The processed sets of data are then reassembled into their original sequence and transmitted to a B-bus 19, for use by the utilization device, the data control 7 of device 9. A more diagrammatic flow diagram of two processing devices and the interconnection of each is shown in FIG. 2.

Figure 2:
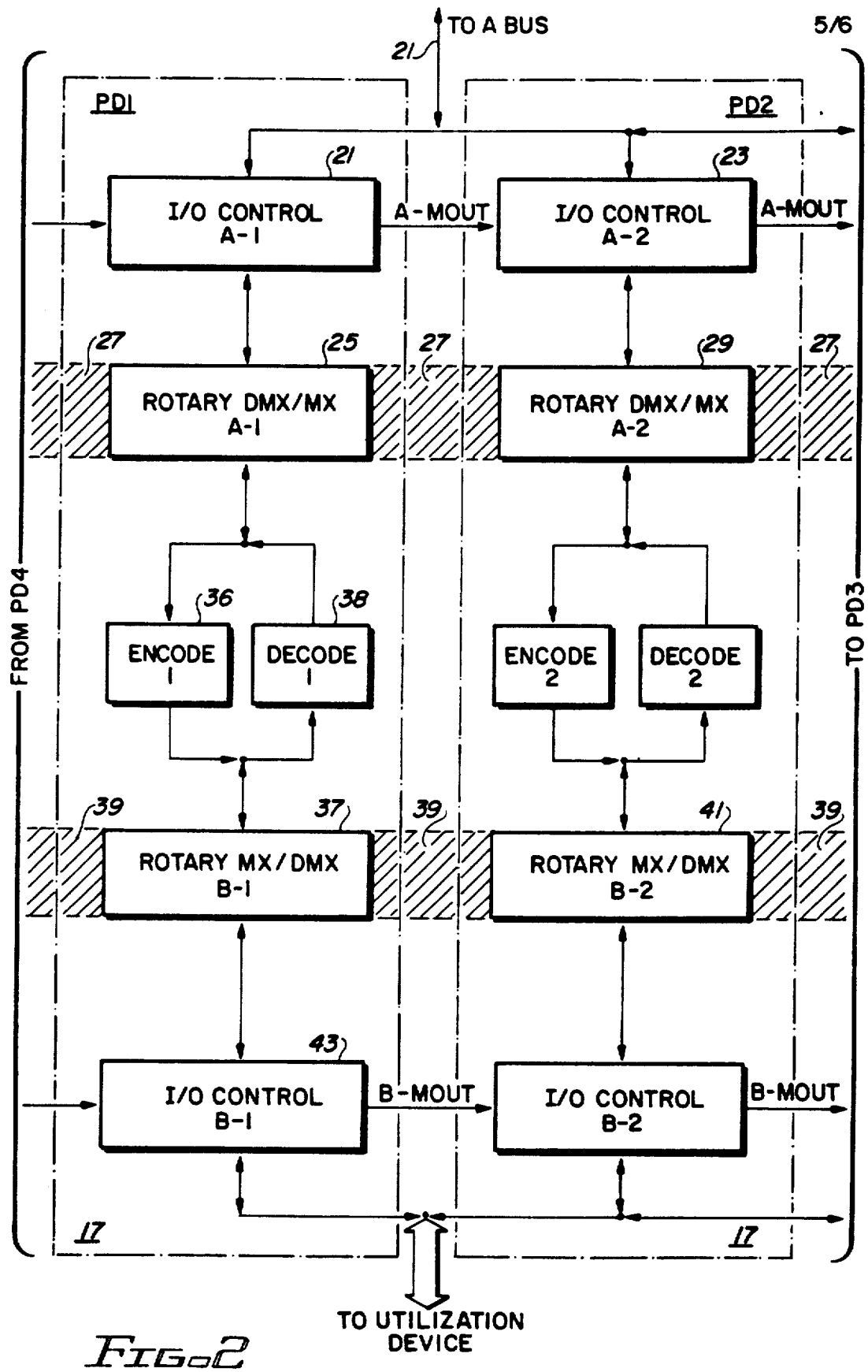
FIG. 2 is a diagrammatic representation of two processing devices of FIG. 1D.

Referring to FIG. 2, the data stream from the channel adaptors 12 is directed onto the A-bus 20, into an input output control 21 and 23, for each of the processing devices PD 1 and PD 2, I/O control A-1 and I/O control A-2. The I/O control A-1, for instance, determines the set of data that is to be directed to processing device PD 1. The A-mout signal determines which I/O control is active at any particular period of time. Processing device PD 1 for instance, also includes a section of a rotary demultiplexer/multiplexer 25, shown as DMX/MXA-1. Sets of dashed and slashed lines 27, connecting the rotary demultiplexer/multiplexer 25, DMX/MX A-1, and a rotary demultiplexer/multiplexer 29, DMX/MX A-2, of processing device PD 2, for instance, shows that the hardware of all of the processing devices 17, are interconnected in order to form one rotary demultiplexer and multiplexer unit that effectively controls the transfer of one set of data into each of the processing units 17. Processing device PD 1, also includes an encode unit 56, and a decode unit 38. The output of the encode 36 and the input to the decode 38 is a rotary multiplexer/demultiplexer 37,MX/DMX B-1, that is the resequencing hardware for the encode 36, and the separation hardware for the decode 38. Similarly for the rotary demultiplexer and multiplexer 25, above, the rotary MX-DMXB-1 is shown with hashed and dotted lines 39, marking to identify that it is a combination of hardware, including a rotary multiplexer/demultiplexer 41, from PD 2, from each of the processing devices that operate to form the second rotary multiplexer and demultiplexer function. The processing device PD 1, also includes an input/output control 43, which controls the output of the data into the utilization device and the inputting of data from the utilization device into the processing device PD 1. The processing devices PD 1-4, operating in parallel according to FIG. 1, therefore, includes an input/output control and a rotary demultiplexer and multiplexer for the top or A section of each of the processing devices and an I/O control and a rotary multiplexer and demultiplexer for the bottom or B section of the processing devices.

As shown in FIG. 2, the data stream is directed from the A-bus to each I/O control of each of the processing devices. The A-mout signal directs which processing device is to get its set of data out of the data stream. The first rotary demultiplexer and multiplexer distributes the set of data to the encode and decode units within its processing device. The lower or B section of each processing device likewise includes an I/O control section and a rotary multiplexer/demultiplexer section tied in with the other hardware of each of the processing devices.

The present invention utilizes four hardware compaction units, two shown in FIG. 2. During a channel write operation, the compaction unit of each processing device compacts the data received on the upper interface A from the host processor and transfers the compacted data stream on the lower interface B to its I/O control and then to the utilization device, i.e., the format control 5, the data control 7 and the transducer 4 to write the compacted data onto the tape media 2, see FIG. 1A. During the channel read operation, the data string from the tape media 2 is directed to each processing device in turn according to the delineation signals separating the compacted sets of data The data is formatted in the format control 5 for transfer to the compaction system 0, in particular to the autoblocking 18 and to the processing device 17 of the compaction unit 16. The compacted data stream is directed to the lower interface B for direction to a decode device for decompaction. The decompacted data is then transferred to the upper interface A for sequencing and transfer back to the A-bus for use by the host central processing unit.

Figure 3:
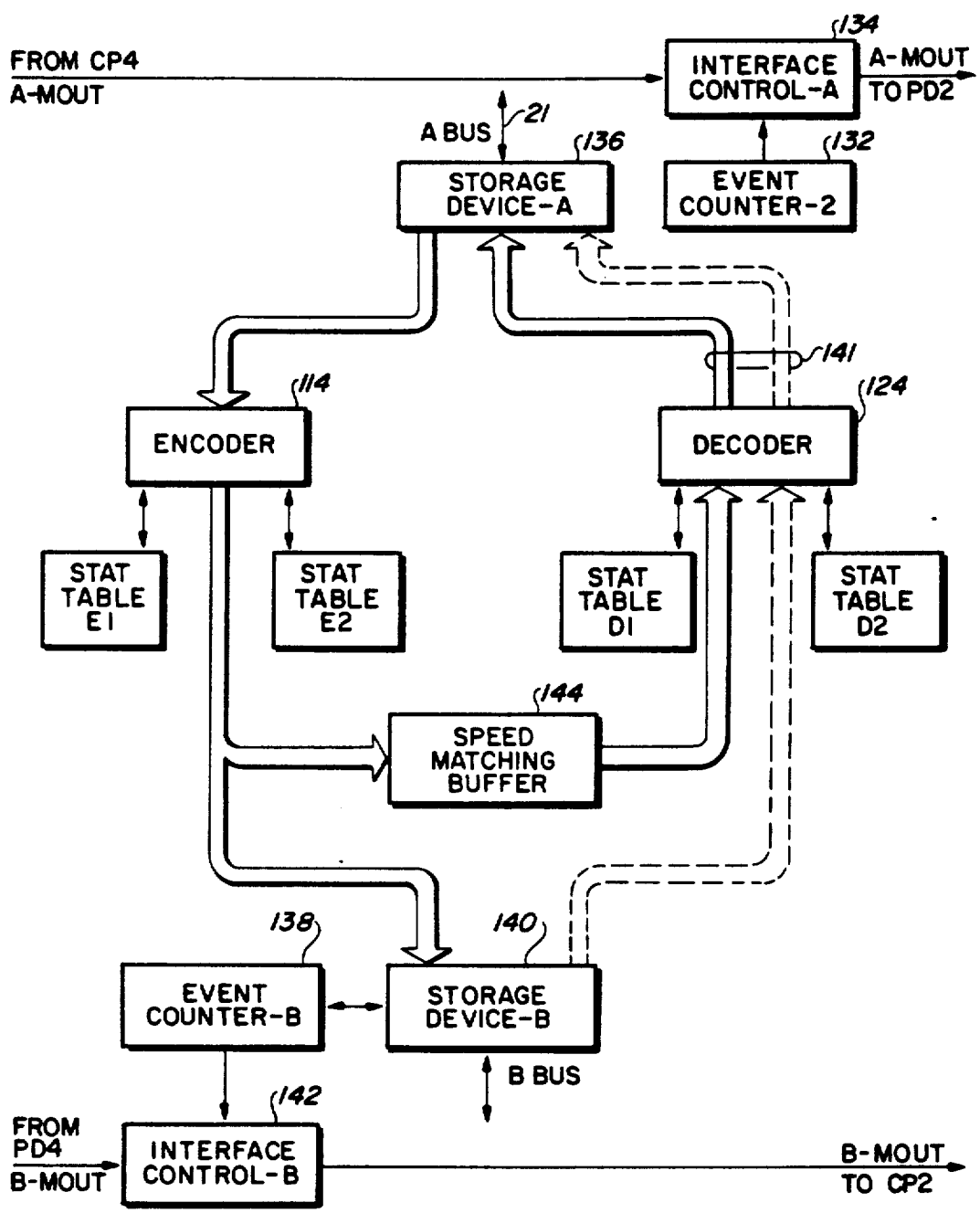
FIG. 3 is a more detailed block diagram of a processing device of FIG. 1D showing a compaction device according to the preferred embodiment.

For the actual hardware included into the processing devices for FIG. 1, reference is made to FIG. 3. As shown in FIG. 3, each processing device and in particular processing device PD 1, includes an event counter 132, an interface control 134, and a storage device 136. These devices are unique to the top or A section of processing device 1. The bottom or B section of the processing device also includes an event counter 138, a storage device 140 and an interface control 142. The processing device also includes one encoder 114, one decoder 124, and a speed matching buffer 144. The event counters A and B are used in each of the processing devices for the upper and lower interfaces to control and verify the splitting and merging of the respective data sets. Through the processing device as shown in FIG. 2, the need for separate multiplexer/demultiplexer control hardware on each interface is eliminated.

Assuming that processing device PD 1, is activated which could be either through the initialization process or the transfer of control from the previous processing device which is processing device PD 4. The signal A-mout transfers the control from one processing device to the next. On the write operation, which is when the data stream from the host is compacted and written onto the tape media, the stream of data is first transmitted into the storage device 136. The storage device 136 signals the event counter 132, that one set of data has been received. For this preferred embodiment, one set of data is 512 bytes. The event counter 132, in turn, signals the interface control 134 that this processing device PD 1, has received its section of data, i.e, one set, and the next set of data should be received by the processing device PD 2. On the write operation, the set of data is transmitted using the solid line bus shown in FIG. 3. The code for the different lines shown in FIG. 3 are a solid single line 146 that signifies the control lines controlling the different blocks, the solid double line 148 that signifies the write data flow (WDF). The signal transfers in the dashed dual line code 150 signifies the read data flow (RDF) signal flow through the processing device PD 1. The set of data is transmitted from the storage device 136 to the encoder 114 for compaction of the set of data. The encoder 114 in turn, after the compaction process is completed, transmits the compacted data set to the speed matching buffer 144 and the storage device B140. The compacted data is transmitted to the speed matching buffer 144 for storage in order to match the output of the encoder 114 with that of the decoder. The just compacted data is transmitted from the speed matching buffer 144 to the decoder 124 for decompaction and checking. Essentially the transfer of the data from the speed matching buffer 144, to the decoder 124 on the write operation is a readback check to verify that the set of data can essentially be encoded and decoded. The compacted data is transferred to the storage device 140 where it will await the control by the event counter 138 and the interface control 142 to signal that the compressed set of data can be placed onto the B-bus for transfer to be formatted for writing onto the tape media. A delineation signal is placed by the storage device 140, between each compressed set of data to identify each compressed set when combined and when retrieved for decompaction.

On the read or retrieve data operation to retrieve data from the media, the compacted sets of data are received from the tape media and transmitted to the storage device 140 after being amplified, digitized and formatted as shown in FIG. 1A-C. The compacted bits of data information are stored within the storage device 140 until the entire compacted set of data is received. At this time the PD 1 is activated either at initialization or as activated by the B-mout signal from PD 4. The delineation signal placed between the compacted sets activates the transfer of the interface control between the processing devices which in turn activates the interface control 142 to transfer control on the B-mout signal line to the next processing device PD 2. Processing device PD 2, can receive its set of data for use within its compaction process. Using the RDF signal path, the stored compacted set of data is transferred to the decoder 124 where it is decompacted and transmitted to storage device 136 on line 141 for storage until the control is given to the interface control unit 134 such that the storage device 136 contains the original 512 bytes of a set of data and can transmit information onto the A-bus 20 to the channel adapters 12. After the decompacted data is transferred, the event counter 132 signals the interface controller to transfer control via the A-mout signal line to the PD 2. This is done such that the next set of data can be transferred from its storage device A of the PD 2, onto the A-bus and eventually to the channel adaptor.

Essentially the storage device 136, the event counter 132, and the interface control unit 134 provides its portion of the multiplexer/demultiplexer for the upper unit of the PD 1. Similarly, the storage device 140, together with the event counter 138, and the interface control 142, perform its portion of the multiplexer/demultiplexer sequence for the lower section B of the PD 1.

Figure 4:
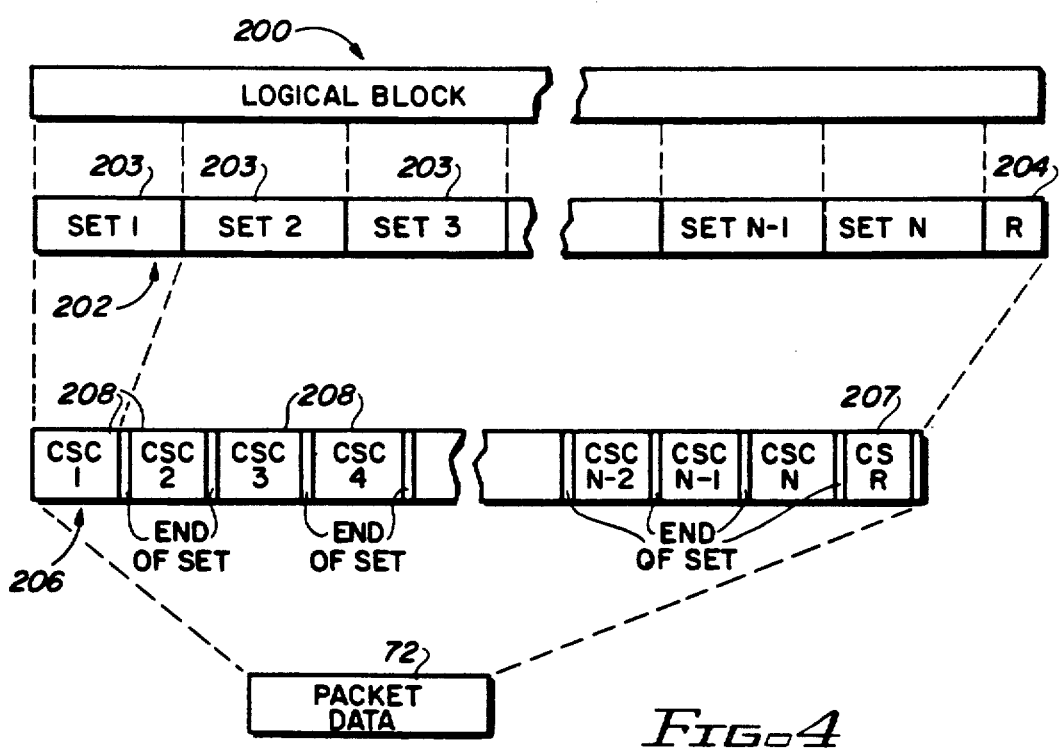
FIG. 4 is a format of the data as directed through the block diagram according to FIG. 3.

Referring to FIG. 4, the formatting of the data stream through the processing device of FIG. 3 is shown. Data from the A-bus 20 is shown as a logical block data stream 200. The logical block data stream 200 is placed into equal lengths of data called sets 203 as shown in data stream 202. The identification of sets is done in the PD 1, to make each set 203 an identical length of data except for the R or remainder section 204 which contains the remaining portion of the data that was not otherwise placed into sets. These sets of data are then directed for compaction where they are shortened to a lesser amount of data as shown on the data storing of reference number 206. The remainder is compacted in a separate compacted character set 207 to compact only the remainder portion and to identify it as something possibly less than a complete set of data. The compacted character sets 208 are then directed for inclusion into a single packet of data 72 as shown in FIG. 4, for writing on the tape media, as previously described. The end of set signals are the delineation signals separating and identifying the individual compacted sets of data 208.

For the present invention, it is possible for there to be any number of processing devices present. The tape subsystem of FIG. 1a determines what that number is, for the best mode of the preferred embodiment, and positions that number in a register that is located within each processing device.

For the preferred embodiment of this invention, during a channel write operation, each processing device receives a 512 byte set of data sequentially from the serial data stream received from the channel adapters on the upper interface A, beginning with PD 1, followed by PD 2, then PD 3 and PD 4, and again returning to PD 1. This packetizing process of the data transfer directs the 512 byte set of data to each processing device in sequence until the entire data stream has been received from the host channel. Each processing device contains a 512 byte buffer in its A or upper section, storage device 136, for instance, for PD 1 on its upper interface to receive and hold the 512 byte set until its encoder 114 empties the storage device 136 to compact the set of data. This allows the next processing device to receive and compact their respective 512 byte set in sequence. By the time a set of data is received by PD 4, PD 1 will have compacted enough of its last set of data, having emptied a minimum of its set of data from storage device 136 to be ready to receive this next set of data, provided the transfer rate from the host channel does not exceed the combined throughput rate of the encoders within each processing device. For the preferred embodiment, the throughput rate of each encoder is 1.25 megabytes for a total combined system throughput rate of 5.0 megabytes per second.

Should the transfer rate from the host exceed the combined throughput rate of the processing device, rendering a given processing device temporarily unable to begin receiving its next set of data, that processing device will then suppress the data transfer from the channel adaptors until such time as enough of its storage device A has been emptied thereby enabling it to resume data transfer. Each storage device A continually checks that more than 128 bytes have been emptied by the encoder subsequent to the last data written into storage device A by the host channel interface. During the time when a given storage device is receiving data from the host, should the number of available storage device A addresses shrink to 128, the processing device suppresses the data transfer from the channel as the current device is received. This allows room in the storage device A, to receive up to 128 data bytes from the host system without overrunning the storage device. Also, while the processing device is receiving data from the host channel, once the storage device A has been filled to a point of 128 addresses from the end of the buffer, the unit will always suppress data transfer as the current byte is received. The subsequent processing device, which is to begin receiving data 128 bytes later, will enable data transfer, nullifying the current processing device's suppression of the data, provided that greater than 128 bytes of space are available at the beginning of its storage device A buffer.

Each compaction unit 16 stores the compacted set of data output from its encoder into a lower storage device B, which is also 512 bytes in size. The compacted sets of data from the lower buffer are transferred in sequence to the B-bus for writing on the tape media as received from the host channel prior to the data being encoded. By the time PD 4 has finished transferring a compacted set of data, PD 1 will be ready to begin transferring its next set of data on the lower interface B. This procedure of data transfer continues until the entire compacted sets of data from the data stream has been sent for writing on the tape media.

During a channel read operation, each processing device receives a compacted set of data sequentially from the serial data stream from the tape media on the lower interface B, beginning with PD 1, followed by PD 2, then PD 3 and PD 4 and again returning to PD 1. This packetizing process of data transfer continues until the entire compressed data stream has been received from the tape media. Each processing device contains the storage device B, on its lower interface B to receive and hold the compacted set while its internal decoder empties the lower storage device B, to decompact the set of data. This allows the next processing device to receive and decompact its respective compacted set of data in sequence. By the time the decompacted set is received by the PD 4, PD 1 will have decompacted enough of its last set, having emptied a minimum portion of its storage device B, to be ready to receive its next compacted set of data.

Each processing device stores the decompacted set output from its decoder into its storage device A. Storage device A, is 512 bytes in size as discussed above. The decompacted sets from the storage device A are transferred in sequence to the host channel as originally received. By the time PD 4 has finished transferring a compacted set, PD 1 should be ready to begin transferring its next set on the host channel interface, provided the transfer rate of the host channel does not exceed the combined throughput rate of the decoders within each processing device.

Should the transfer rate to the host exceed the combined throughput rate of the compaction system, rendering a given compaction unit temporarily unable to begin transferring its next set, that unit will then suppress data transfer to the channel until such time as enough of its upper buffer has been filled enabling it to resume data transfer. Each compaction unit continuously checks that data is available in its upper buffer subsequent to the last upper buffer address read from by the host channel interface. During the time when a given compaction unit is transferring data to the host, should there be no more data available in the upper buffer, the compaction unit suppresses data transfer to the channel as the last byte is transferred. Also, while a compaction unit is transferring data to the host channel, once its upper buffer has been emptied, the unit will always suppress data transfer as the last byte is transferred. The subsequent unit, which is to begin transferring the next byte of data, will enable data transfer, nullifying the current unit's suppression, provided enough of its upper buffer has been filled.

Further description of the processing of the data on a tape media system is described in the Milligan, et al., U.S. Pat. No. 4,435,762, assigned to the assignee of the present invention.

While the invention has been particularly shown and described with reference to the preferred embodiment thereof, it will be understood by those skilled in the art that various changes in form and details may be made therein without departing from the spirit and scope of the invention.

What is claimed is:

1. An information processing system for processing a stream of data and including a plurality of parallel and sequentially connected data processing units, each of the data processing units comprising:
   means for counting that a certain size section of data, one set of data, had been received by the data processing unit associated with said data;
   first storage means for storing the sets of data;
   first signalling means controlled by said counting means for signalling a next sequentially connected data processing unit that this data processing unit has received said data processing unit's set of data and that the next data processing unit should receive said next data processing unit's set of data;
   a processing device for processing said data processing unit's set of data;
   second storage means for storing the set of data processed by said processing device;
   second signalling means for signalling that said second storage means is ready to transmit said data processing unit's processed set of data; and
   means for transmitting said data processing unit's processed set of data for inclusion in sequence from other processing devices of the plurality of parallel data processing units.

2. An information processing system as defined by claim 1, wherein each set of data processed by each of the plurality of data processing units includes 512 bytes except for a remainder byte length left over after all possible complete sets are removed from the stream of data.

3. An information processing system as defined in claim 1, wherein said processing devices is a binary arithmetic compaction processor.

4. An information processing system as defined in claim 1, wherein said processing device is an encoder of a compaction processor.

5. An information processing system as defined in claim 4, wherein said first storing means, said first counting means and said first signalling means of each of the data processing units together form a demultiplexer to direct one set of data in turn to each of said encoders of each of the data processing units.

6. An information processing system for processing a stream of data and including a plurality of parallel and sequentially connected data processing units, each of the data processing units comprising:
   a first storage device for accepting and storing a set of data from the stream of data;
   a first event counter for counting a certain number of bytes received by said storage device to from the set of data by controlling an amount of data received by said storage device;
   a first interface control controlled by said first event counter reaching a count of the set of data for activating a next sequentially connected data processing unit that this data processing unit has received said data processing unit's set of data and that the next data processing unit should receive said next data processing unit's set of data;
   a compaction system including an encoder for compacting the set of data from the first storage device and for adding an end of set signal;
   a second storage device for accepting and storing the compacted set of data from said encoder of said compaction system;
   a second event counter for determining when an entire set of data has been compacted by said encoder by sensing the end of set signal;
   a second interface control controlled by said second event counter determining that the set of data has been compacted and for transmitting the compacted set of data from said second storage device when the second interface control is activated by said second event counter sensing the end of set signal and for signalling a subsequent data processing unit that said data processing unit has transmitted said data processing unit's compacted set of data; and
   means for transmitting the compacted sets of data from each of the second storage device in each of the data processing units for use by a utilization device;
   whereby the utilization device receives the compacted sets of data in a same sequence as the set sequence extracted from the stream of data.

7. The information processing system as defined in claim 6, wherein;
   said second storage device further adapted to accept compacted sets of data from the utilization device under control of said second interface control;
   said second event counter sensing that said second storage device has stored that compacted set of data and the end of set signal;
   said second interface control ending the transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that the set of decompacted data for its data processing unit has been transmitted; and said interface control transferring the transmission control to the first interface control of the subsequent data processing unit;

whereby the decompacted sets of data from each of the first storage devices of each of the data processing units place the decompacted sets of data into the original sequence of the compacted sets of data.

8. An information processing system as defined in claim 6, wherein each set of data processed by each of the plurality of data processing units includes 512 bytes except for a remainder byte length left over after all possible complete sets are removed from the streams of data.

9. An information processing system as defined in claim 7, wherein said encoder and decoder compress and decompress data using a binary arithmetic compaction process.

10. An information processing system as defined in claim 7, wherein said first storage device, said first event counter and said first interface control of each of the data processing units together form a demultiplexer and multiplexer to direct one set of data to each associated encoder and to combine one set of data from each associated decoder.

11. A data processing system for compressing data from a central processing unit for storage on a media comprising:

a control unit including at least one channel for transmission of data to and from the central processing unit under command control of the central processing unit, a command unit to process commands, a compaction system for compressing the data, and a format control; and a device including a drive for transporting the media past a transducer, a motion control under control of said command unit for controlling said drive, and a data control to activate the transducer to write data onto the media and to retrieve data from the media as the drive transports the media;

said compaction system including a plurality of parallel and sequentially connected data processing units, sand an autoblocking unit accepting the sequenced compressed sets of data to create a block of data from a plurality of the compressed sets and to add one data signal identifying a plurality of the blocks of compressed sets;

each of the data processing units comprising:

means for counting that a certain size section of data, one set of data, had been received by the data professing unit associated with said data;

first storage means for storing the sets of data connected;

first signalling means controlled by said counting means for signalling a next sequentially connected data processing unit that this data processing unit has received said data processing unit's set of data and that the next data processing unit should receive said next data processing unit's set of data;

an encoder for compacting said data processing unit's set of data;

second storage means for storing the set of data processed by said processing device;

second signalling means for signalling that said second storage means is ready to transmit said data processing unit's processed set of data; and means for transmitting said data processing unit's proceeessed set of data for inclusion in sequence from the other processing devices of the plurality of parallel data processing units to said autoblocking unit;

said format control accepting the blocks of compressed sets of data from said autoblocking unit and transmitting the compressed sets of data to said data control for writing the compressed data into the media under control of said command unit;

said command unit activating said motion control to control said drive and activating said compaction system and said format control to process the write data flow from the channel adapters through said compaction systems, said format control and said data control to write the compressed data onto the media for storage thereon.

12. An information processing system as defined by claim 11, wherein each set of data processed by each of the plurality of data processing units include 512 bytes except for a remainder byte length left over after all possible complete sets are removed from the stream of data.

13. An information processing system as defined in claim 11, wherein said processing devices is a binary arithmetic compaction processor.

14. An information processing system as defined in claim 11, wherein said first storing means, said first counting means and said first signalling means of each of the data processing units together form a demultiplexer to direct one set of data in turn to each of said encoders of each of the data processing units.

15. A data processing system as defined in claim 11 wherein said compaction system decompresses the compressed data and wherein;

said channel adaptors receiving a read command from the central processing unit and said command unit responsive thereto to activate said motion control of said device to transport the media past the transducer to read the compressed data from the media, the compressed data being directed to said data control and said format control for processing and to said autoblocking unit of said compaction system for decompression;

said autoblocking unit accepting the blocks of compressed sets of data and removing the added data signals from the compressed sets of data;

said second storage device further adapted to accept compacted sets of data from said autoblocking unit under control of said second interface control;

said second event counter sensing that said second storage device has stored that compacted set of data and the end of set signal;

said second interface control ending the transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that the set of decompacted data for its data processing unit has been transmitted; and said interface control transferring the transmission control to the first interface control of the subsequent data processing unit;

whereby the decompacted sets of data from each of the first storage devices of each of the data processing units place the decompacted sets of data into the original sequence of the compacted sets of data for transmission to the channel adaptors for use by the central processing unit.

16. A data processing system for compressing data from a central processing unit for storage on a media comprising:

a control unit including channel for transmission of data to and from the central processing unit under command control of the central processing unit, a command unit to process command controls, a compaction system for compressing the data, and a format control; and a device including a drive for transporting the media past a transducer, a motion control under control of said command unit for controlling said drive, and a data control to activate the transducer to write data onto the media and to retrieve data from the media as the drive transports the media;

said compaction system including a plurality of parallel and sequentially connected data processing units, and an autoblocking unit accepting the sequenced compressed sets of data to create a block of data from a plurality of the compressed sets and to add one data signal identifying a plurality of the blocks of compressed sets;

said format control accepting the blocks of compressed sets of data from said autoblicking unit and transmitting the compressed sets of data to said data control for writing the compressed data into the media under control of said command unit;

said command unit activating said motion control to control said drive and activating said compaction system and said format control to process the write data flow from the channel adapters through said compaction systems, said format control and said data control to write the compressed data onto the media for storage thereon;

each of the data processing units comprising:

a first storage device for accepting and storing a set of data from the stream of data;

a first event counter for counting a certain number of bytes received by said storage device to form the set of data by controlling the amount of data received by said storage device;

a first interface control controlled by said first event counter reaching the count of the set of data for activating the next sequentially connected data processing unit that this data processing unit has received said data processing unit's set of data and that the next data processing unit should receive said next data processing unit's set of data;

a compaction system including an encoder for compacting the set of data from the first storage device and for adding an end of set signal;

a second storage device for accepting and storing the compacted set of data from said encoder of said compact system;

a second event counter for determining when the entire set of data has been compacted by said encoder by sensing the end of set signal;

a second interface control controlled by said second event counter determining that the set of data has been compacted and for transmitting the compacted set of data from said second storage device when the second interface control is activated by said second event counter sensing the end of set signal and for signalling a subsequent data processing unit that it has transmitted its compacted set of data; and mean for transmitting the compacted sets of data from each of the second storage device in each of the data processing units to said autoblocking unit;

whereby said autoblocking unit receives the compacted sets of data in the same sequence as the set sequence extracted from the stream of data.

17. The information processing system as defined in claim 16, wherein;

said second storage device further adapted to accept compacted sets of data from said autoblocking unit under control of said second interface control;

said second event counter sensing that said second storage device has stored that compacted set of data and the end of set signal;

said second interface control ending the transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that the set of decompacted data for its data processing unit has been transmitted; and said interface control transferring transmission control to the first interface control of the subsequent data processing unit;

whereby the decompacted sets of data from each of the first storage devices of each of the data processing units place the decompacted sets of data into the original sequence of the compacted sets of data for transmission to the channel adaptors for use by the central processing unit.

18. An information processing system as defined n claim 17, wherein said encoder and decoder compress and computes data using a binary arithmetic compaction process.

19. An information processing system as defined in claim 17, wherein said first storage device, said first event counter and said first interface control of each of the data processing units together form a demultiplexer and multiplexer to direct one set of data to each associated encoder and to combine one set of data from each associated decoder.

20. An information processing system as defined in claim 16, wherein each set of data processed by each of the plurality of data processing units includes 512 bytes except for a remainder byte length left over after all possible complete sets are removed from the streams of data.

21. A data processing system for compressing data from a central processing unit for storage on a media comprising:
- a control unit including a channel for transmission of data to and from the central processing unit under command control of the central processing unit, a command unit to process command controls, a compaction system for compressing the data, and a format control; and
- a device including a drive for transporting the media past a transducer, a motion control under control of said command unit for controlling said drive, and a data control to activate the transducer to write data onto the media and to retrieve data from the media as the drive transport the media;
- said compaction system including a plurality of parallel and sequentially connected data processing units, and an autoblocking unit accepting the sequenced compressed sets of data to create a block of data from a plurality of the compressed sets and to add one data signal identifying a plurality of the blocks of compressed sets;
- each of the data processing units comprising:
- means for counting that a certain size section of data, one set of data, had been received by the data processing unit associated with said data;
- first storage means for storing the sets of data connected;
- first signalling means controlled by said counting means for signalling the next sequentially connected data processing unit that this data processing unit has received said data processing unit's set of data and that the next data processing unit should receive said next data processing unit's set of data;
- an encoder for compacting said data processing unit's set of data;
- second storage means for storing the set of data compacted by said encoder; and
- second signalling means for signalling that said second storage means is ready to transmit said data processing unit's compressed set of data;
- means connected to said second signalling means of each data processing unit for combining in sequence, all compressed sets of data;
- said format control accepting the blocks of compressed sets of data from said autoblocking unit and transmitting the compressed sets of data to said data control for writing the compressed data into the media under control of said command unit;
- said command unit activating said motion control to control said drive and activating said compaction system and said format control to process the write data flow from the channel adapters through said compacting systems, said format control and said data control to write the compressed data onto the media for storage thereon.

22. An information processing system as defined by claim 21, wherein each set of data compressed by each of the plurality of data processing units includes 512 bytes except for a remainder byte length left over after all possible complete sets are removed from the stream of data.

23. An information processing system as defined in claim 21, wherein said processing devices is a binary arithmetic compaction processor.

24. An information processing system as defined in claim 21, wherein said first storing means, said first counting means and said fist signalling means of each of the data processing units together form a demultiplexer to direct one set of data in turn to each of said encoders of each of the data processing units.

25. A data processing system as define din claim 21 wherein said compaction system decompresses the compressed data and wherein;
- said channel receiving a read command from the control processing unit and said command unit responsive thereto to activate said motion control of said device to transport the media past the transducer to read the compressed data from the media, the compressed data being directed to said data control and said format control for processing and to said autoblocking unit of said compaction system for decompression;
- said autoblocking means separates the block of data into the plurality of compressed sets;
- said combining means separates the plurality of compressed sets of data into individual sets of compressed data;
- and further including means including a plurality of decoders each accepting one individual set of compressed data in sequential order from said combining means and compressing each set into a decompressed individual set of data;
- said means for creating sets of data recombining the individual sets of decompressed data into the decompressed stream of data; and
- said channel receiving the decompressed stream of data directing the stream of data to the central processing unit.

26. A data processing system for compressing data from a central processing unit for storage on a media comprising:
- a control unit including a channel for transmission of data to and from the central processing unit under command control of the central processing unit, a command unit to process command controls, a compaction system for compression the data, and a format control; and
- a device including a drive for transporting the media past a transducer, a motion control under control of said command unit for controlling said drive, and a data control to activate the transducer to write data onto the media and to retrieve data from the media as the drive transports the mediā;
- said compaction system including a plurality of parallel and sequentially connected data processing units, and an autoblocking unit accepting the sequenced compressed sets of data to create a block of data from a plurality of the compressed sets and to add one data signal identifying a plurality of the blocks of compressed sets;
- said format control accepting the blocks of compressed sets of data from said autoblocking unit and transmitting the compressed sets of data to said data control for writing the compressed data into the media under control of said command unit;
- said command unit activating said motion control to control said drive and activating said compaction system and said format control to process the write data flow from the channel adapters through said compaction systems, said format control and said data control to write the compressed data onto the media to storage thereon;

each of the data processing units comprising:

a first storage device for accepting and storing a set of data from the stream of data;

a first event counter for counting a certain number of bytes received by said storage device to form the set of data by controlling the amount of data received by said storage device;

a first interface control controlled by said first event counter reaching the count of the set of data for activating the next sequentially connected data processing unit that this data processing unit has received said data processing unit's set of data and that the next data processing unit should receive said next data processing unit's set of data;

a compaction system including an encoder for compacting the set of data from the first storage device and for adding an end of set signal;

a second storage device for accepting and storing the compacted set of data from said encoder of said compacting system;

a second event counter for determining when an entire set of data has been compacted by said encoder by sensing the end of set signal;

a second interface control controlled by said second event counter determining that the set of data has been compacted and for transmitting the compacted set of data from said second storage device when the second interface control is activated by said second event counter sensing the end of set signal and for signalling a subsequent data processing unit that said data processing unit has transmitted said data processing unit's compacted set of data; and means for transmitting the compacted sets of data from each of the second storage device in each of the data processing units to said autoblocking unit;

whereby said autoblocking unit receives the compacted sets of data in the same sequence as the set sequence extracted from the stream of data.

27. The information processing system as defined in claim 26, wherein;

said second storage device further adapted to accept compacted sets of data from said autoblocking unit under control of said second interface control;

said second event counter sensing that said second storage device has stored that compacted set of data and the end of set signal;

said second interface control ending transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that the set of decompacted data for its data processing unit has been transmitted; and said interface control transferring transmission control to the first interface control of the subsequent data processing unit;

whereby the decompacted sets of data from each of the first storage devices of each of the data processing units place the decompacted sets of data into the original sequence of the compacted sets of data for transmission to the channel for use by the central processing unit.

28. An information processing system as defined in claim 27, wherein said encoder and decoder compress and decompress data using a binary arithmetic compaction process.

29. An information processing system as defined in claim 27, wherein said first storage device, said first event counter and said first interface control of each of the data processing units together form a demultiplexer and multiplexer to direct one set of data to each associated encoder and to combine one set of data from each associated decoder.

30. An information processing system as defined in claim 26, wherein each set of data processed by each of the plurality of data processing units includes 512 bytes except for a remainder byte length left over after all possible complete sets are removed from the streams of data.

31. A data processing system for compressing data from a central processing unit for storage on a media comprising a control unit including at least one adaptor for transmission of data to and from the central processing unit under command control of the central processing unit, a command unit to process command controls, a compacting system for compressing the data, and a format control;

said compaction system including a plurality of parallel and sequentially connected data processing units, and an autoblocking unit accepting the sequenced compressed sets of data to create a block of data from a plurality of the compressed sets and to add one data signal identifying a plurality of the blocks of compressed sets;

said format control accepting the blocks of compressed sets of data from said autoblocking unit and transmitting the compressed sets of data for writing onto the media under control of said command unit;

said command unit activating said compaction system and said format control to process the write data flow from the adaptor through said compaction system and said format control to write the compressed data onto the media for storage thereon;

each of the data processing units comprising:

means for counting that a certain size section of data, one set of data, had been received by the data processing unit associated with said data;

first storage means for storing the sets of data connected;

first signalling means controlled by said counting means for signalling the next sequentially connected data processing unit that this data processing unit has received said data processing unit's set of data and that the next data processing unit should receive said next data processing unit's set of data;

an encoder for compacting said data processing unit's set of data;

second storage means for storing the set of data processed by said processing device;

second signalling means for signalling that said second storage means is ready to transmit said data processing unit's processed set of data; and means for transmitting said data processing unit's processed set of data for inclusion in sequence from the other processing devices of the plurality of parallel data processing units to said autoblocking unit.

32. A data processing system as defined in claim 31 wherein said compaction system decompresses the compressed data and wherein;

said adaptor receiving a read command from the central processing unit and said command unit responsive there to retrieve the compressed data from the media, the compressed data being directed to said format control for processing and to said autoblocking unit of said compaction system for decompression;

said autoblocking unit accepting the blocks of compressed sets of data from the read data unit and removing the added data signals from the compressed sets of data;

said second storage device further adapted to accept compacted sets of data from the said autoblocking unit under control of said second interface control;

said second event counter sensing that said second storage device has stored that compacted set of data and end of set signal;

said second interface control ending the transfer of data into its associated second storage device and for activating the second interface control in the subsequent data processing unit when said second interface control senses that the end of set signal has been sensed by said second event counter;

said compaction system further includes a decoder for compacting the compacted set of data stored in said second storage device;

said first storage device further storing the set of data decompacted by said decoder;

said first event counter further counting the set of decompacted data and for signalling said first interface control that set of decompacted data for its data processing unit has been transmitted; and said interface control transferring the transmission control to the first interface control of the subsequent data processing unit;

whereby the decompacted sets of data from each of the first storage devices of each of the data processing units place the decompacted sets of data into the original sequence of the compacted sets of data for transmission to the adaptor for use by the central processing unit.

33. An information processing system as defined by claim 31, wherein each set of data processed by each of the plurality of data processing units includes 512 bytes except for a remainder byte length left over after all possible complete sets are removed from the stream of data.

34. An information processing system as defined in claim 31, wherein said processing devices is a binary arithmetic compaction processor.

35. An information processing system as defined in claim 31, wherein said first storing means, said first counting means and said first signalling means of each of the data processing units together form a demultiplexer to direct one set of data in turn to each of said encoders of each of the data processing units.

36. A data processing system for compressing data from a central processing unit for storage on a media comprising:

a control unit including a channel for transmission of data to and from the central processing unit under command control of the central processing unit, a command unit to process command controls, a compaction system for compressing the data, and a format control;

said compaction system including a plurality of parallel and sequentially connected data processing units, and an autoblocking unit accepting the sequenced compressed sets of data to create a block of data from a plurality of the compressed sets and to add one data signal identifying a plurality of the blocks of compressed sets;

said format control accepting the blocks of compressed sets of data from said autoblocking unit and transmitting the compressed sets of data for writing onto the media under control of said command unit;

said command unit activating said compaction system and said format control to process the write data flow from the channel adapters through said compaction systems and said format control to write the compressed data onto the media for storage thereon;

each of the data processing units comprising:

a first storage device for accepting and storing a set of data from the stream of data;

a first event counter for counting a certain number of bytes received by said storage device to form the set of data by controlling the amount of data received by said storage device;

a first interface control controlled by said first event counter reaching the count of the set of data for activating the next sequentially connected data processing unit that this data processing unit has received said data processing unit's set of data and that the next data processing unit should receive said next data processing unit's set of data;

a compaction system including an encoder for compacting the set of data from the first storage device and for adding an end of set signal;

a second storage device for accepting and storing the compacted set of data from said encoder of said compaction system;

a second event counter for determining when the entire set of data has been compacted by said encoder by sensing the end of set signal;

a second interface control controlled by said second event counter determining that the set of data has been compacted and for transmitting the compacted set of data from said second storage device when the second interface control is activated by said second event counter sensing the end of set signal and for signalling a subsequent data processing unit that said data processing unit has transmitted said data processing unit's compacted set of data; and means for transmitting the compacted sets of data from each of the second storage device in each of the data processing units to said autoblocking unit;

whereby said autoblocking unit receives the compacted sets of data in the same sequence as the set sequence extracted from the stream of data.

37. The information processing system as defined in claim 36, wherein;

said second storage device further adapted to accept compacted sets of data from said autoblocking unit under control of said second interface control;

said second event counter sensing that said second storage device has stored that compacted set of data and the end of set signal;

said second interface control ending transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that the set of decompacted data for its data processing unit has been transmitted; and said interface control transferring transmission control to the first interface control of the subsequent data processing unit;

whereby the decompacted sets of data from each of the first storage devices of each of the data processing units place the decompacted sets of data into the original sequence of the compacted sets of data for transmission to the channel adaptors for use by the central processing unit.

38. An information processing system as defined in claim 37, wherein said encoder and decoder compress and decompress data using a binary arithmetic compaction process.

39. An information processing system as defined in claim 37, wherein said first storage device, said first event counter and said first interface control of each of the data processing units together form a demultiplexer and multiplexer to direct one set of data to each associated encoder and to combine one set of data from each associated decoder.

40. An information processing system as defined in claim 36, wherein each set of data processed by each of the plurality of data processing units includes 512 bytes except for a remainder byte length left over after all possible complete sets are removed from the streams of data.

41. A data processing system for compressing data from a central processing unit for storage on a media comprising a control unit including channel adapters for transmission of data to and from the central processing unit under command control of the central processing unit, a command unit to process command controls, a compaction system for compressing the data, and a format control;

said compaction system including a plurality of parallel and sequentially connected data processing units and means for autoblocking the resequenced compressed sets to add one data signal identifying a block of data formed by said autoblocking means from a plurality of the compressed sets;

each of the data processing units comprising:

means for counting that a certain size section of data, one set of data, had been received by the data processing unit associated with said data;

first storage means for storing the sets of data connected;

first signalling means controlled by said counting means for signalling the next sequentially connected data processing unit that this data processing unit has received said data processing unit's set of data and that the next data processing unit should receive said next data processing unit's set of data;

an encoder for compacting said data processing unit's set of data;

second storage means for storing the set of data compacted by said encoder; and second signalling means for signalling that said second storage means is ready to transmit said data processing unit's compressed set of data;

means connected to said second signalling means of each data processing unit for combining in sequence all compressed sets of data;

said format control accepting the blocks of compressed sets of data from said autoblocking means and transmitting the compressed sets of data onto the media under control of said command unit; and said command unit activating said compaction system and said format control to process the write data flow from the channel adapters through said compaction systems and said format control to write the compressed data onto the media for storage thereon.

42. An information processing system as defined by claim 41, wherein each set of data compressed by each of the plurality of data processing units includes 512 bytes except for a remainder byte length left over after all possible complete sets are removed from the stream of data.

43. An information processing system as defined in claim 41, wherein said encoder is a binary arithmetic compaction processor.

44. An information processing system as defined in claim 41, wherein said first storing means, said first counting means and said first signalling means of each of the data processing units together form a demultiplexer to direct one set of data in turn to each of said encoders of each of the data processing units.

45. A data processing system as defined in claim 41 wherein said compaction system decompresses the compressed data and wherein;

said channel adaptors receiving a read command from the control processing unit and said command unit responsive thereto to activate said motion control of said device to transport the media past the transducer to read the compressed data from the media, the compressed data being directed to said data control and said format control for processing and to said autoblocking unit of said compaction system for decompression;

said autoblocking means separates the block of data into the plurality of compressed sets;

said combining means separates the plurality of compressed sets of data into individual sets of compressed data;

and further including means including a plurality of decoders each accepting one individual set of compressed data in sequential order from said combining means and decompressing each set into a decompressed individual set of data;

said means for creating sets of data recombining the individual sets of decompressed data into the decompressed stream of data; and said channel adaptors receiving the decompressed stream of data directing the stream of data to the central processing unit.

46. A data processing system for compressing data from a central processing unit for storage on a media comprising a control unit including channel adapters for transmission of data to and from the central processing unit under command control of the central processing unit, a command unit to process command controls, a compaction system for compressing the data, and a format control;

said compaction system including a plurality of parallel and sequentially connected data processing units and means for autoblocking the resequenced compressed sets to add one data signal identifying a block of data formed by said autoblocking means from a plurality of the compressed sets;

each of the data processing units comprising:

a first storage device for accepting and storing a set of data from the stream of data;

a first event counter for counting a certain number of bytes received by said storage device to form the set of data by controlling the amount of data received by said storage device;

a first interface control controlled by said first event counter reaching the count of the set of data for activating the next sequentially connected data processing unit that this data processing unit has received said data processing unit's set of data and that the next data processing unit should receive said next data processing unit's set of data;

a compaction system including an encoder for compacting the set of data from the first storage device and for adding an end of set signal;

a second storage device for accepting and storing the compacted set of data from said encoder of said compaction system;

a second event counter for determining when the entire set of data has been compacted by said encoder by sensing the end of set signal;

a second interface control controlled by said second event counter determining that the set of data has been compacted and for transmitting the compacted set of data from said second storage device when the second interface control is activated by said second event counter sensing the end of set signal and for signalling a subsequent data processing unit that said data processing unit has transmitted said data processing unit's compacted set of data; and means for transmitting the compacted sets of data from each of the second storage device in each of the data processing units to said autoblocking units;

whereby said autoblocking unit receives the compacted sets of data in the same sequence as the set sequence extracted from the stream of data;

said format control accepting the blocks of compressed sets of data from said autoblocking unit and transmitting the compressed sets of data for writing the compressed data onto the media under control of said command unit; and said command unit activating said compaction system and said format control to process the write data flow from the channel adapters through said compaction system to write the compressed data onto the media for storage thereon.

47. The information processing system as defined in claim 46, wherein;

said second storage device further adapted to accept compacted sets of data from said autoblocking unit under control of said second interface control;

said second event counter sensing that said second storage device has stored that compacted set of data and the end of set signal;

said second interface control ending transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that the set of decompacted data for its data processing unit has been transmitted; and said interface control transferring transmission control to the first interface control of the subsequent data processing unit;

whereby the decompacted sets of data from each of the first storage devices of each of the data processing units place the decompacted sets of data into the original sequence of the compacted sets of data for transmission to the channel adaptors for use by the central processing unit.

48. An information processing system as defined in claim 47, wherein said encoder and decoder compress and decompress data using a binary arithmetic compaction process.

49. An information processing system as defined in claim 47, wherein said first storage device, said first event counter and said first interface control of each of the data processing units together form a demultiplexer and multiplexer to direct one set of data to each associated encoder and to combine one set of data from each associated decoder.

50. An information processing system as defined in claim 46, wherein each set of data processed by each of the plurality of data processing units includes 512 bytes except for a remainder byte length left over after all possible complete sets are removed from the streams of data.

51. A data processing system for compressing data comprising:

at least one adaptor operational to accept the data and commands, a command unit to process the commands, a compaction system for compressing the data, and a format control;

said compaction system including a plurality of parallel and sequentially connected data processing units, each of the data processing units comprising:

means for counting that a certain size section of data, one set of data, had been received by the data processing unit associated with said data;

first storage means for storing the sets of data connected;

first signalling means controlled by said counting means for signalling the next sequentially connected data processing unit that this data processing unit has received said data processing unit's set of data and that the next data processing unit should receive said next data processing unit's set of data;

an encoder for compacting said data processing unit's set of data;

second storage means for storing the set of data processed by said processing device;

second signalling means for signalling that said second storage means is ready to transmit said data processing unit's processed set of data; and means for transmitting said data processing unit's processed set of data for inclusion in sequence from the other processing devices of that plurality of parallel data processing units;

said format control accepting the blocks of compressed sets of data from said transmitting means for writing the compressed data into a third storage means under control of said command unit.

52. An information processing system as defined in claim 51, wherein said processing devices is a binary arithmetic compaction processor.

53. A data processing system as defined in claim 51 wherein said compaction system decompresses the compressed data and wherein;

said adaptor receiving a retrieve command and said command unit responsive thereto to retrieve the compressed data from said third storage device, the compressed data being directed to said format control for processing and to said compaction system for decompression;

said second storage device further adapted to accept the compacted sets of data from said third storage device under control of said second interface control;

said second event counter sensing that said second storage device has stored that compacted set of data and end of set signal;

said second interface control ending the transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage device;

said first storage device further storing the set of data decompacted by said decoder;

said first event counter further counting the set of decompacted data and for signalling said first interface control that set of decompacted data for its data processing unit has been transmitted; and said interface control transferring the transmission control to the first interface control of the subsequent data processing unit;

whereby the decompacted sets of data from each of the first storage devices of each of the data processing units place the decompacted sets of data into the original sequence of the compacted sets of data for transmission to the adaptor.

54. A data processing system for compressing data for storage on a media comprising:

at least one adaptor operational to accept data and commands, a command unit to process the commands, a compacting system for compressing the data, and a format control; and a device including a drive for transporting the media past a transducer, a motion control under control of said command unit for controlling said drive, and a data control to activate the transducer to write data onto the media and to retrieve data from the media as the drive transports the media;

said compaction system including a plurality of parallel and sequentially connected data processing units, each of the data processing units comprising:

means for counting that a certain size section of data, one set of data, had been received by the data processing unit associated with said data;

first storage means for storing the sets of data connected;

first signalling means controlled by said counting means for signalling the next sequentially connected data processing unit that this data processing unit has received said data processing unit's set of data and that the next data processing unit should receive said next data processing unit's set of data;

an encoder for compacting said data processing unit's set of data;

second storage means for storing the set of data processed by said processing device;

second signalling means for signalling that said second storage means is ready to transmit said data processing unit's processed set of data; and means for transmitting said data processing unit's processed set of data for inculsion in sequence from the other processing devices of the plurality of parallel data processing units to said autoblocking unit;

said format control accepting the blocks of compressed sets of data from said autoblocking unit and transmitting the compressed sets of data to said data control for writing the compressed data into the media under control of said command unit;

said command unit activating said motion control to control said drive and activating said compaction system and said format control to process the write data flow from the channel adapters through said compaction systems, said format control and said data control to write the compressed data onto the media for storage thereon.

55. An information processing system as defined in claim 54, wherein said processing devices is a binary arithmetic compaction processor.

56. A data processing system as defined in claim 54 wherein said compaction system decompresses the compressed data and wherein;

said adaptor receiving a retrieve command and said command unit responsive thereto to activate said motion control of said device to transport the media past the transducer to read the compressed data from the media, the compressed data being directed to said data control and said format control for processing and to said compaction system for decompression;

said second storage device further adapted to accept the compacted sets of data from said media under control of said second interface control;

said second event counter sensing that said second storage device has stored that compacted set of data and the end of set signal;

said second interface control ending transfer of data into its associated second storage device and for activating the second interface control in the subsequent data processing unit when said second interface control senses that the end of set signal has been sensed by said second event counter;

said compaction system further includes a decoder for decompacting the compacted set of data stored in said second storage deice;

said first storage device further storing the set of data decompacted by said decoder;

said first event counter further counting the set of decompacted data and for signalling said first interface control that the set of decompacted data for its data processing unit has been transmitted; and said interface control transferring transmission control to the first interface control of the subsequent data processing unit;

whereby the decompacted sets of data from each of the first storage devices of each of the data processing units place the decompacted sets of data into the original sequence of the compacted sets of data for transmission to the adaptor.

57. A data processing system for compressing data for storage comprising an adaptor operational to accept data and commands, a command unit to process the commands, a compaction system for compressing the data, and a format control;

said compaction system including a plurality of parallel and sequentially connected data processing units and means for autoblocking the resequenced compressed sets to add one data signal identifying a block of data formed by said autoblocking means from a plurality of the compressed sets;

each of the data processing units comprising:

means for counting that a certain size section of data, one set of data, had been received by its data processing unit;

first storage means for storing the sets of data connected;

first signalling means controlled by said counting means for signalling the next sequentially connected data processing unit that this data processing unit has received said data processing unit's set of data and that the next data processing unit should receive said next data processing unit's set of data:

an encoder for compacting said data processing unit's set of data;

second storage means for storing the set of data compacted by said encoder; and second signalling means for signalling that said second storage means is ready to transmit said data processing unit's compressed set of data;

means connected to said second signalling means of each data processing unit for combining in sequence all compressed sets of data;

said format control accepting the blocks of compressed sets of data from said autoblocking means;

a storage device receiving the blocks of compressed data form said format control;

said command unit activating said compaction system and said format control to process the write data flow from the adaptor through said compaction systems and said format control to write the compressed data into said storage device for storage therein.

58. A data processing system as defined in claim 57 wherein said compaction system decompresses the compressed data and wherein;

said adaptor receiving a read command and responsive thereto to retrieve the compressed data from said storage device, the compressed data being directed to said format control for processing and to said autoblocking unit of said compaction system for decompression;

said autoblocking means separates the block of data into the plurality of compressed sets;

said combining means separates the plurality of compressed sets of data into individual sets of compressed data;

and further including means including a plurality of decoders each accepting one individual set of compressed data in sequential order from said combining means and decompressing each set into a decompressed individual set of data;

said means for creating sets of data recombining the individual sets of decompressed data into the decompressed stream of data; and said channel adaptors receiving the decompressed stream of data directing the stream of data to the central processing unit.

* * * * *

UNITED STATES PATENT AND TRADEMARK OFFICE
CERTIFICATE OF CORRECTION

PATENT NO. : 5,226,156
DATED : July 6, 1993
INVENTOR(S) : Neil H. MacLean, Jr., et. al.

It is certified that error appears in the above-indentified patent and that said Letters Patent is hereby corrected as shown below:

At column 14, line 20, the word "from" should be --form--.

At column 15, line 54, the word "sand" should be --and--.

At column 17, line 43, the word "autoblicking" should be --autoblocking--.

At column 18, line 58, the word "n" should be --in--; at line 60, the word "computes" should be --decompress--.

At column 19, line 21, the word "transport" should be --transports--; at line 62, the word "compacting" should be --compaction--.

At column 20, line 12, the words "define din" should be --defined in--; at line 32, the word "compressing" should be --decompressing--; at line 47, the word "compression" should be --compressing--.

At column 21, line 5, the word "to" should be --for--.

UNITED STATES PATENT AND TRADEMARK OFFICE
CERTIFICATE OF CORRECTION

Page 2 of 2

PATENT NO. : 5,226,156
DATED : July 6, 1993
INVENTOR(S) : Neil H. MacLean, Jr., et. al.

It is certified that error appears in the above-indentified patent and that said Letters Patent is hereby corrected as shown below:

Column 29, line 62, the word "compacting" should be --compaction--.

At column 30, line 26, the word "inculsion" should be --inclusion--.

At column 31, line 3, the word "deice" should be --device--.

At column 32, line 12, the word "form" should be --from--.

Signed and Sealed this

Seventh Day of June, 1994

Attest:

BRUCE LEHMAN

Attesting Officer          Commissioner of Patents and Trademarks